Jan. 16, 1945.   L. L. RAYMOND   2,367,611
CANDLE ORNAMENT FOR CHRISTMAS TREES
Filed Feb. 26, 1941

Inventor
LAMBERT L. RAYMOND
By Chas. C. Reyf
Attorney

Patented Jan. 16, 1945

2,367,611

UNITED STATES PATENT OFFICE 2,367,611

CANDLE ORNAMENT FOR CHRISTMAS TREES

Lambert L. Raymond, Minneapolis, Minn.

Application February 26, 1941, Serial No. 380,673

5 Claims. (Cl. 41—10)

This invention relates to a Christmas tree ornament and particularly to such an ornament designed to simulate a lighted candle.

It is an object of the invention to provide a simple and efficient structure which will be highly decorative and which will give the appearance of a lighted candle on the tree, particularly of a colored candle.

It is a further object of the invention to provide such a device having an elongated intermediate portion of preferably cylindrical form and having an outer surface of highly reflective capacity, an upper portion reduced in diameter at its lower end and tapered at its upper end to simulate a candle flame, said portion being formed of or covered with tinsel and having a lower portion formed as a fastening means for securing the ornament on the Christmas tree.

It is also an object of the invention to provide such a device as set forth in the preceding paragraph together with an upwardly facing shallow cup preferably having a flat bottom secured on said ornament at the lower end of said intermediate portion.

It is also an object of the invention to provide a Christmas tree ornament having an elongated intermediate portion of uniform diameter and having a highly reflective outer surface, an upper shorter portion tapered at its upper end and formed to simulate a candle flame, said upper portion being formed of or covered with tinsel and a lower portion formed as a fastening means and preferably comprising spaced resilient prongs adapted to grip a support for supporting said ornament.

These and other objects and advantages of the invention will be fully set forth in the following description made in connection with the accompanying drawing in which like reference characters refer to similar parts throughout the several views and in which.

Figure 1:
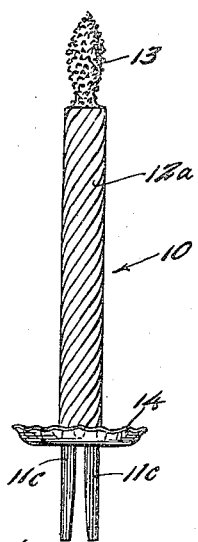
Fig. 1 is a view in side elevation of the ornament.
Figure 3:
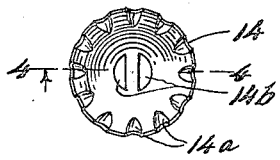
Fig. 3 is a top plan view of a cup used.
Figure 4:
Fig. 4 is a vertical section taken on line 4—4 of Fig. 3 as indicated by the arrow.
Figure 2:
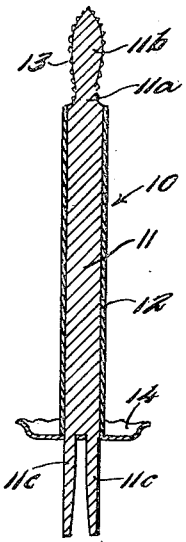
Fig. 2 is a central vertical section through the ornament.

Referring to the drawing, particularly Figs. 1 to 4, a Christmas tree ornament is shown comprising a central or intermediate portion 10. Portion 10 is of elongated form and substantially of uniform diameter and is preferably cylindrical. While this portion may be variously formed, in the embodiment of the invention shown in Figs. 1 to 4 it comprises a central core 11. While core 11 could be variously made, it preferably is formed of an integral piece of wood. A sleeve 12 surrounds core 11 at its intermediate portion and sleeve 12 will be formed of some sheet material such as sheet metal, metal foil or some form of paper of other sheet material. Sleeve 12 will have an outer surface of highly reflective capacity and as shown in Fig. 1 the same is formed on its outer surface with longitudinally extending helical grooves 12a. Above sleeve 12 core 11 has a part 11a of reduced diameter and the part 11b thereabove is of general cylindrical biconical form having a tapering upper end. Portion 11b is formed to simulate a candle flame and its outer surface is covered with some highly reflecting substance. Portion 11b will be covered with some highly reflecting substance such as metal foil, or as shown in the embodiment of the invention illustrated, with tinsel flakes 13. A highly glistening effect is thus given to part 11b. Below sleeve 12 core 11 is bifurcated to form spaced prongs 11c tapering toward their lower ends. These prongs will be somewhat resilient and are formed so that they may be positioned to embrace and grip a twig of the Christmas tree to support the ornament. A cup 14 having a diameter much greater than the diameter of sleeve 12 and of shallow formation preferably having a flat bottom is disposed at the bottom of sleeve 12. Cup 14 has an outwardly curved scalloped edge 14a and is formed with spaced segmental shaped slots 14b in its bottom through which prongs 11c extend. Slots 14b are of such size that prongs 11c fit tightly therein and cup 14 is thus frictionally held in position.

Figures 5, 8:
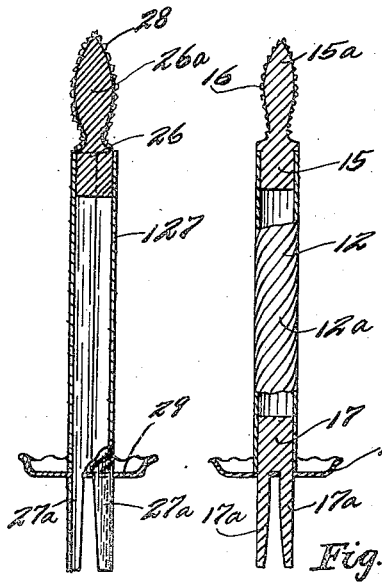
Fig. 5 is a view partly in side elevation and partly in central vertical section showing a modification.
Fig. 8 is a view similar to Fig. 5 showing another modification.

In Fig. 5 a form is shown in which sleeve 12 is used having the grooves 12a but in which the core does not extend entirely through sleeve 12. Instead, a member 15 is tightly inserted in the upper end of sleeve 12 having a shoulder engaging the top of said sleeve and having a portion 15a above sleeve 12 reduced in diameter at its lower end and tapered substantially to a point at its upper end, the same being substantially like portion 11b already described. Portion 15a is formed to simulate a candle flame and is covered with tinsel flakes 16. At the bottom of sleeve 11 a member 17 is tightly fitted in said sleeve at the lower portion thereof and has its lower portion below said sleeve bifurcated to form the tapered prongs 17a similar to prongs 11c. A cup 18 similar in all respects to cup 14 already described is secured on prongs 17a just as cup 14 is secured on prongs 11c. It will be seen that the exterior appearance of the form shown in Fig. 5 is substantially the same as that shown in Figs. 1 to 4.

Figure 6:
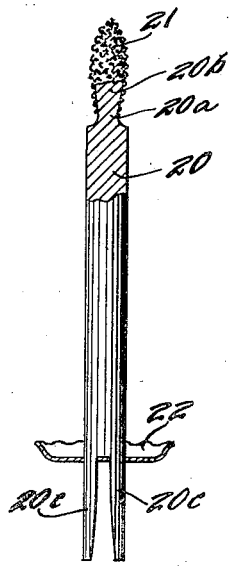
Fig. 6 is a similar view showing a modification.

In Fig. 6 a form is shown in which the core 20 is used, the same having a part 20a of reduced diameter adjacent its upper end and a portion 20b thereabove formed the same as portion 11b already described. Portion 20b thus simulates a candle flame and is covered with a multiplicity of tinsel flakes 21. The lower portion of core 20 is bifurcated to form spaced resilient prongs 20c similar to prongs 11c and 17a already described and a cup 22 similar to cups 14 and 18 is secured on prongs 20c in the same manner that said cups 14 and 18 are secured on the similar prongs 11c and 17a. The outer surface of member 20 between portion 20a and the prongs 20c is very smooth and highly polished and will be colored with some suitable coating either by being tumbled in bronze powder or by being painted or coated with some highly reflecting colored paint.

Figure 7:
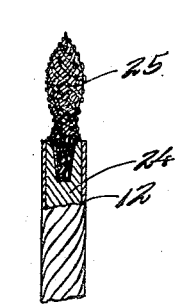
Fig. 7 is a view partly in vertical section and partly in side elevation showing a further modification.

In Fig. 7 a form is shown having the sleeve 12 and core portion 24 and in which the portion 25 formed to simulate a candle flame is made of a body of strings covered with tinsel flakes, said body being of the general biconical form and tapered to a substantial point at its upper end. The tinsel strings are preferably given a slight twist or helical form and body 25 will thus simulate a candle flame and have a highly reflective effect. Body 25 is secured in core portion 24 by adhesive.

Referring to Fig. 8 a form is shown in which sleeve 127 is used and a member 26 is secured in the top of sleeve 127 in some suitable manner as by adhesive. Member 26 is of reduced diameter above sleeve 127 and has a portion 26a shaped similarly to portion 11b, the same being tapered at its upper end and formed to simulate a candle flame. Tinsel flakes 28 cover the outer surface of portion 26a. Sleeve 127 is formed at its lower end with spaced prong portions 27a which will be somewhat resilient. Sleeve 127 can be rolled from a substantially rectangular blank having the spaces between portions 27a cut therefrom at one end. A cup member 29 similar to cups 14 and 18 is provided having slots therein through which pronge 27a project and in which they will tightly fit to hold said cup in place.

From the above description it will be seen that I have provided a simple, easily constructed and highly ornamental device which will give the effect of a candle on the Christmas tree. Candles are perhaps one of the most artistic things used on a Christmas tree but are not now used owing to their great fire hazard and in fact, their use is prohibited in many places. The device can be easily and quickly placed on the tree and firmly supported thereon. The ornamental effect is heightened and the device made more striking owing to the upright position thereof. In most cases the electric lights most commonly used on the Christmas trees are in the depending position. The ornament has been amply demonstrated in actual practice, found to be very successful and efficient and is being commercially made. The ornaments are put up for marketing in sets and the intermediate portions will be made of different colors such as red, blue, green and gold. These give highly decorative effects on the tree.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A Christmas tree ornament having in combination, a central substantially cylindrical upstanding portion of opaque material having an exterior surface of highly reflective capacity, a solid opaque portion at the upper end of said portion tapering toward its upper end and formed to simulate the flame of a candle, a tinsel covering for said last mentioned portion and means extending downwardly from the lower end of said cylindrical portion bifurcated to have spaced resilient prongs adapted to a grip a support for said ornament, and an upwardly facing shallow cup extending about said ornament at the lower end of said first mentioned portion.

2. A Christmas tree ornament having in combination, a vertically extending opaque core reduced in diameter adjacent one end and extending above said reduced portion and having an integral upwardly tapering end formed to simulate a candle flame, an intermediate portion below said portion of reduced diameter of substantially uniform diameter and a lower portion bifurcated to form spaced resilient prongs adapted to grip a support, said intermediate portion being opaque but having an exterior surface of high reflective capacity, and an upwardly facing cup having a substantially flat bottom secured to said member and through which said prongs extend.

3. A Christmas tree ornament having in combination, a central portion of substantially uniform diameter, the same being reduced in diameter at the upper end of said central portion and having a portion thereabove flaring upwardly and then tapering to substantially a point, a highly reflective covering for said portion above said reduced portion and a lower portion below said intermediate portion having spaced opposed parts forming a fastening means and an upwardly facing shallow cup having a diameter several times the diameter of said intermediate portion secured at the bottom of said intermediate portion.

4. A Christmas tree ornament having in combination, a central elongated core, said core having a part reduced in diameter adjacent its upper end, said part tapering at its upper terminal end to simulate a candle flame, a highly reflective covering for said part, said core having a lower bifurcated portion forming spaced tapered prongs adapted to resiliently embrace a support and a sleeve surrounding said core between said bifurcated portion and said part of reduced diameter, said sleeve having longitudinally extending helical grooves formed therein ind having its exterior surface of high reflective capacity.

5. An ornament constituting an imitation candle having in combination, a self-contained device comprising a member having a central elongated cylindrical portion of rigid opaque material forming a supporting means for said ornament and having an exterior surface of high reflective capacity, a second solid opaque member above said cylindrical member and supported thereby, having a lower part adjacent said cylindrical member of smaller diameter and forming a shoulder with said cylindrical member to simulate the top of a candle, said second member being substantially circular in transverse cross section and gradually flaring upwardly from said lower part and then gradually tapering to a point to simulate a candle flame, an opaque covering of high reflective capacity for said second member, said cylindrical member having a fastening means at its lower end.

LAMBERT L. RAYMOND.